United States Patent [19]
Adams

[11] Patent Number: 6,085,692
[45] Date of Patent: Jul. 11, 2000

[54] SQUIRREL ATTRACTING DEVICE

[76] Inventor: Kenneth P. Adams, 954 Sunny Field La., Lawrenceville, Ga. 30043

[21] Appl. No.: 09/270,980

[22] Filed: Mar. 17, 1999

[51] Int. Cl.[7] .................................................... A01K 5/00
[52] U.S. Cl. ........................................ 119/51.03; 119/52.2
[58] Field of Search ................................. 119/51.03, 52.2, 119/52.4, 55, 57.8

[56] References Cited

U.S. PATENT DOCUMENTS

| D. 117,482 | 11/1939 | Mustarkes | 119/57.8 |
|---|---|---|---|
| D. 119,499 | 3/1940 | Howard | 119/51.03 |
| D. 170,150 | 8/1953 | Cowap | 119/52.2 |
| D. 274,377 | 6/1984 | Nock | 119/57.8 |
| 2,235,959 | 3/1941 | Copeman | 119/51.03 |
| 2,392,532 | 1/1946 | Hyde | 119/51.03 |
| 3,175,536 | 3/1965 | Hilaire | 119/51.03 |
| 3,730,139 | 5/1973 | Moore | 119/52.2 |
| 3,777,711 | 12/1973 | Gampp | 119/52.2 |
| 4,632,062 | 12/1986 | Hubbard | 119/51.03 |
| 4,896,628 | 1/1990 | Kadunce | 119/51.03 |
| 5,184,569 | 2/1993 | Collins | 119/55 |
| 5,467,736 | 11/1995 | Reynolds | 119/52.2 |
| 5,664,522 | 9/1997 | Keller | 119/52.2 |
| 5,755,178 | 5/1998 | Lush | 119/51.03 |

*Primary Examiner*—Peter M. Poon
*Assistant Examiner*—Elizabeth Shaw
*Attorney, Agent, or Firm*—Hinkle & Associates, P.C.

[57] ABSTRACT

A wild animal feeder (11) having a mounting post (12) upon which is mounted a platform (27) which may be accessed by an animal by a rope (26) hanging down near the ground. Mounted on the platform is a holder (16, 19) for wild animal food. A first embodiment has one climbing rope to access the platform. A second embodiment adds a teeter-totter board (29) with a counterbalance (34) upon which an animal can play. A third embodiment has a teeter-totter board mounted to a double-ended platform having two access apertures (25) and two climbing ropes to give easy access to a plurality of animals.

14 Claims, 3 Drawing Sheets

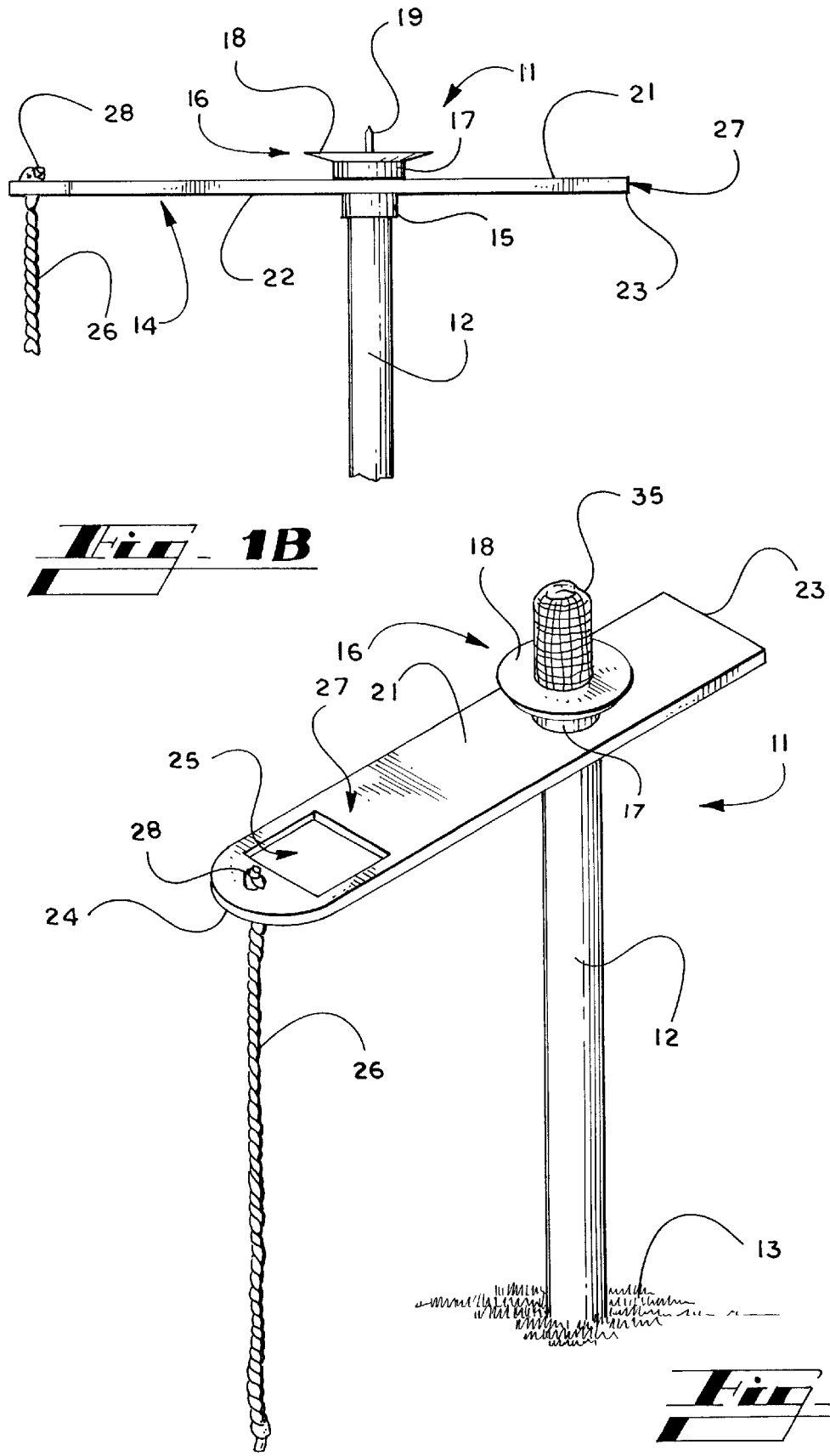

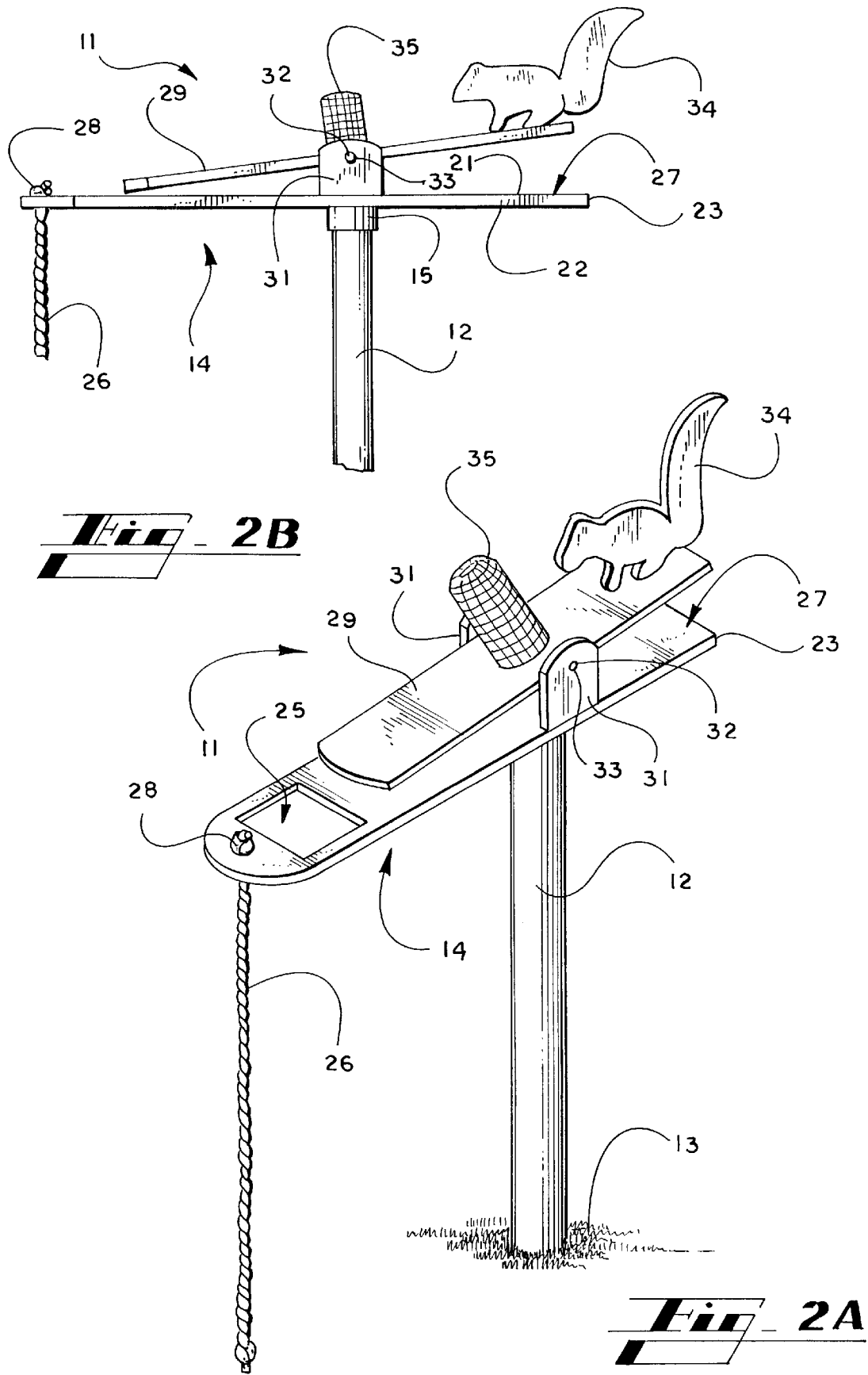

SQUIRREL ATTRACTING DEVICE

BACKGROUND OF THE INVENTION

I. Field of the Invention

The present invention relates generally to the field of wild animal feed dispensing devices and, more particularly, to a device which will attract wild animals such as squirrels, and will provide squirrels with a safe place to feed and play. The device will further provide persons who are watching nearby with considerable enjoyment.

II. Description of the Related Art

There are many wild animal feeders on the market, all of which provide considerable enjoyment to individuals who can spend time observing the animals when they come to feed. By and large, these feeders relate to birds with very few wild animal feeders for other types of animals. In the field of bird feeders, however, persons who place the bird feeders at their homes typically do not want the feeders invaded by other animals. Squirrels, by their playful nature and voracious appetites, typically love to invade bird feeders for the food which these feeders provide. This type of invasion by the squirrels typically causes problems for the persons who have placed the feeders there for birds. There are numerous types of bird feeders which have anti-squirrel mechanisms which keep the squirrels away from the feeders.

There are known, in the prior art, certain feeders which are designed especially for squirrels. It is to these types of feeders to which the present invention pertains. It has been found that squirrel feeders which provide moving mechanisms will attract squirrels quite readily, because squirrels are quite intelligent and appear to love to play either alone or in conjunction with other squirrels. Since squirrels have an enormous ability for climbing, jumping and maintaining their balance upon moving objects, various prior art squirrel feeders typically use rotary and rocking motions.

Certain of the prior art squirrel feeders utilize fixed feeding stations where squirrels can climb and eat, but these feeders do not have any movement nor any motion to entice the squirrel. Typical of these types of feeders is the patent to Raymond Lush (U.S. Pat. No. 5,755,178) which shows a wild game feeder which is screwed into a suitable wood post or tree and has, at a distal end, a spike to which the user can screw a bulk food item such as an ear of corn. Obviously, there is no movement associated with this type of feeder. Other fixed type of feeders are similar to the patent to Leo Kadunce (U.S. Pat. No. 4,896,628) which shows a multi-tiered food container having a plurality of food distribution ports and trays so that a squirrel, or other type of animal, can climb to the food tray and receive food.

Entertaining and movable types of squirrel feeders are exemplified by the Jack E. Hubbard Patent (U.S. Pat. No. 4,632,062) which shows a movable feeder having a frame attached to a tree with a long rotating bar pivotally attached to the frame. At one end of the bar is a spike to which solid food, such as an ear of corn, may be attached. When the squirrel leaps upon the bar, the bar will tend to rotate due to the gravitational weight pull of the squirrel's body thereby providing amusement to persons watching. A similar type of device is shown in the Cryil N. Keller Patent (U.S. Pat. No. 5,664,522) which shows a ground engaging mechanism having an upright pole to which is pivotally attached a rotating bar having a counter weight at one end thereof, and a food fixing member at the other end. The squirrel, when alighting upon the rotating bar, will tend to rotate the bar and the food providing enjoyment for those watching.

Another type of rotating feeder is exemplified by the Robert R. Reynolds Patent (U.S. Pat. No. 5,467,736) showing a food container that will dispense food therefrom when the squirrel alights upon a rotatable spoked wheel which, when rotated, will tend to dispense food from the container into a trough, thereby rewarding the squirrel for its enthusiastic performance.

SUMMARY OF THE INVENTION

In accordance with the present invention and the contemplated problems which have and continue to exist in this field, objectives of this invention are to provide a squirrel attracting device which will allow a user to both feed squirrels nearby and to watch the antics of one or more squirrels upon the device cavorting with one another. In the present invention, there are three embodiments contemplated. The first embodiment is a squirrel attracting device having a ground engaging mounting post to which there is a mounting hub affixed to the upper end thereof, and to the mounting hub there is a platform which may or may not rotate as the user desires. Atop the platform is a feed holder and feed tray which has a center spike which is utilized to impale solid food. At one end of the platform, there is a climbing rope which projects downwardly toward the ground to allow easy climbing access to a squirrel to mount the platform. There may or may not be an access opening in the platform through which the squirrel can gain access to the platform, depending upon the desires of the user.

A second embodiment is much like the first embodiment, but has an added attraction where there is pivoted a teeter-totter board upon which a squirrel may alight to get to the solid food mounted in the center thereof. The solid food is normally mounted on a spike to keep the food adjacent to the teeter-totter board. At one end of the teeter-totter board, for counterbalance purposes, there may be a counter weight of some description and, typically, the counter weight might be the form of an animal and be heavy enough to counterbalance a squirrel on the open end of the teeter-totter board.

In the third embodiment, the attracting device is much like that shown in the second embodiment with the exception that the counterbalance weight would be eliminated inasmuch as the third embodiment is for the use by two or more squirrels. Therefore, the platform would be identical on both ends, wherein both ends would have a climbing rope depending therefrom and each one might have access ports therein for the squirrel to climb through. A teeter-totter board would be mounted essentially thereupon.

In all of the embodiments, a rope has been described as the mechanism which the squirrel uses to climb to the perch area. It should be noted that any suitable material could be used in lieu of rope. Further, while the device is described as "ground" mounted, it is obvious that it could be mounted on any suitable surface in any suitable area.

By providing separate feeding facilities for squirrels, one can decrease the invasion and damage done to bird feeders by squirrels and can also provide hours of entertainment as the squirrels are much more active and acrobatic as they climb upon the squirrel perch of the present invention and play upon the teeter-totter board as described.

Other objects, advantages and capabilities of the invention will become apparent from the following description taken in conjunction with the accompanying drawings showing the preferred embodiments of the invention.

BRIEF DESCRIPTION OF THE DRAWINGS

FIG. 1A is a perspective view of a first embodiment of the invention;

FIG. 1B is a partial elevation view of the first embodiment of FIG. 1A;

FIG. 2A is a perspective view of a second embodiment of the invention showing a teeter-totter board with a counterweight thereon;

FIG. 2B is a partial elevation view of the embodiment of FIG. 2A;

DESCRIPTION OF THE PREFERRED EMBODIMENTS

Figure 3B:
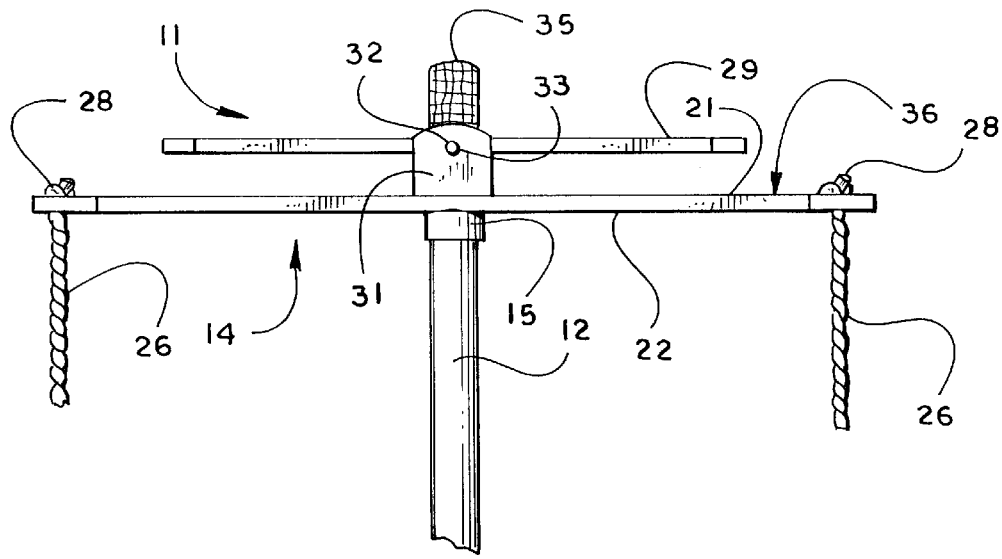
FIG. 3B is a partial elevation view of the embodiment of FIG. 3A.

For a fuller understanding of the nature and desired objects of this invention, reference should be made to the following detailed description taken in connection with the accompanying drawings. Referring to the drawings wherein like reference numerals designate corresponding parts throughout the several figures, reference is made first to FIGS. 1A and 1B. A squirrel attracting device 11 is shown mounted in the ground (see FIG. 1A) and generally comprises a ground engaging mounting post 12 having one end firmly planted in the ground 13, and having the squirrel perch 14 mounted at the distal end of the mounting post. The squirrel perch is mounted to the distal upper end of the mounting post and, underneath the perch 14, is a mounting hub 15 which supports the perch at the upper distal end of the mounting post. In order to maintain the perch 14 to the mounting post and firmly adjacent the mounting hub 15, is a feed holder 16 which has a lower base portion 17, which firmly engages the upper surface of the squirrel perch 14 and also engages the uppermost distal portion of the mounting post 12 to maintain the squirrel perch positioned between the lower base portion 17 and the mounting hub 15.

It should be noted that in all embodiments herein, the squirrel perch assembly may be fixedly mounted to the mounting post 12 or, for more interesting interaction with the squirrels who will play upon the invention herein, the more probable mounting procedure will be to mount the squirrel perch upon the mounting post in such a manner that it will rotate in a horizontal plane due to interaction with the squirrels playing with the various items of the perch 14. To provide even more interesting possibilities of play to the squirrel and to provide musical accompaniment, it is anticipated that wind chimes might be incorporated into the device.

The feed holder 16 has a tray 18 into which the owner of the device will place loose food for easy access to the squirrel. The tray 18 would typically have a concave inner surface to hold the food, and the bottom portion of the concave surface would be fixed to the uppermost rim portion of the lower base portion 17. Frequently, it is advisable and desirable to mount solid food to squirrel feeders such as a cob of corn and the like, and, to effect the mounting, it is anticipated that a spike 19 would be provided in the central portion of the tray 18 projecting upwardly so that the owner of the device could impale a cob of corn thereupon. The spike could be of any reasonable configuration such as a long rather stiff nail or it could be a threaded screw type device onto which the corn could be placed, and, in this configuration, it would be very difficult for a squirrel to remove the cob of corn.

As noted, the squirrel perch 14 can be mounted to rotate in a horizontal plane for interaction with a squirrel. In the embodiments of FIGS. 1A and 1B, the squirrel perch is a platform 27 of generally planar configuration having an upper surface 21 and a lower surface 22, along with a truncated end 23 and a squirrel receiving end 24. The squirrel receiving end 24 generally has an access opening 25 through which a squirrel may gain access to the upper surface 21. In order to attain the upper surface 21, a squirrel may possibly climb the mounting post 12, but will most probably utilize the climbing rope 26 which is of sufficient length to hang close to the ground 13 and be fixed in the platform member 27 through a suitable aperture therein and then secured by a securing knot 28 in the upper end of the climbing rope.

Once the squirrel has found the climbing rope 26, it is a simple matter for the squirrel to climb up to the top of the rope, move through access opening 25 and gain the upper surface 21 of platform 27. Thence, the squirrel may access the feed holder 16 and partake of the delights which have been left there for the squirrel. All the while, due to the movement of the squirrel, the squirrel perch 14 may very well revolve around the mounting post 12 adding a degree of joy to those watching.

In a second embodiment of the invention shown in FIGS. 2A and 2B, the squirrel perch 14 has been modified to dispense with the feed holder 16 and replace it by a teeter-totter board 29. The teeter-totter board 29 is supported on the upper surface 21 of platform 17 by a pair of spaced apart supports 31 which are mounted to the upper surface 21 by suitable fasteners and comprise a pair of upright members spaced apart from one another. Between the two supports 31, the teeter-totter board is mounted on pivot pin 32 which projects through suitable apertures 33 in each support 31. As is the usual case, the teeter-totter board is capable of pivoting so that either end thereof will pivot upwardly and downwardly depending upon the pressure exerted upon either end. In the embodiment of FIGS. 2A and 2B, it is anticipated that should one single squirrel be playing on the squirrel attracting device 11, it would be necessary to have some sort of a counterbalance weight on the teeter-totter board to assist the squirrel in properly utilizing the board. Consequently, it is anticipated that a counterweight 34 will be placed on one end of the teeter-totter board 29 to effect the balancing aspect of the board should a squirrel be playing on the other end. In the case shown in FIGS. 2A and 2B, the counterweight could well take the form of a squirrel and be made of any suitable heavy material such as iron. In the center of the teeter-totter board 29, is a piece of solid animal food 35, as previously described, and would be mounted on a suitable spike to impale the food and to maintain it to the board 29. In the case of the embodiment of FIGS. 2A and 2B, the squirrel perch 14 would also have the capability of rotating in a horizontal plane around the mounting post 12 as was described in the first embodiment, and the squirrel would gain access to the upper areas of the perch 14 in the same manner as previously described.

Figure 3A:
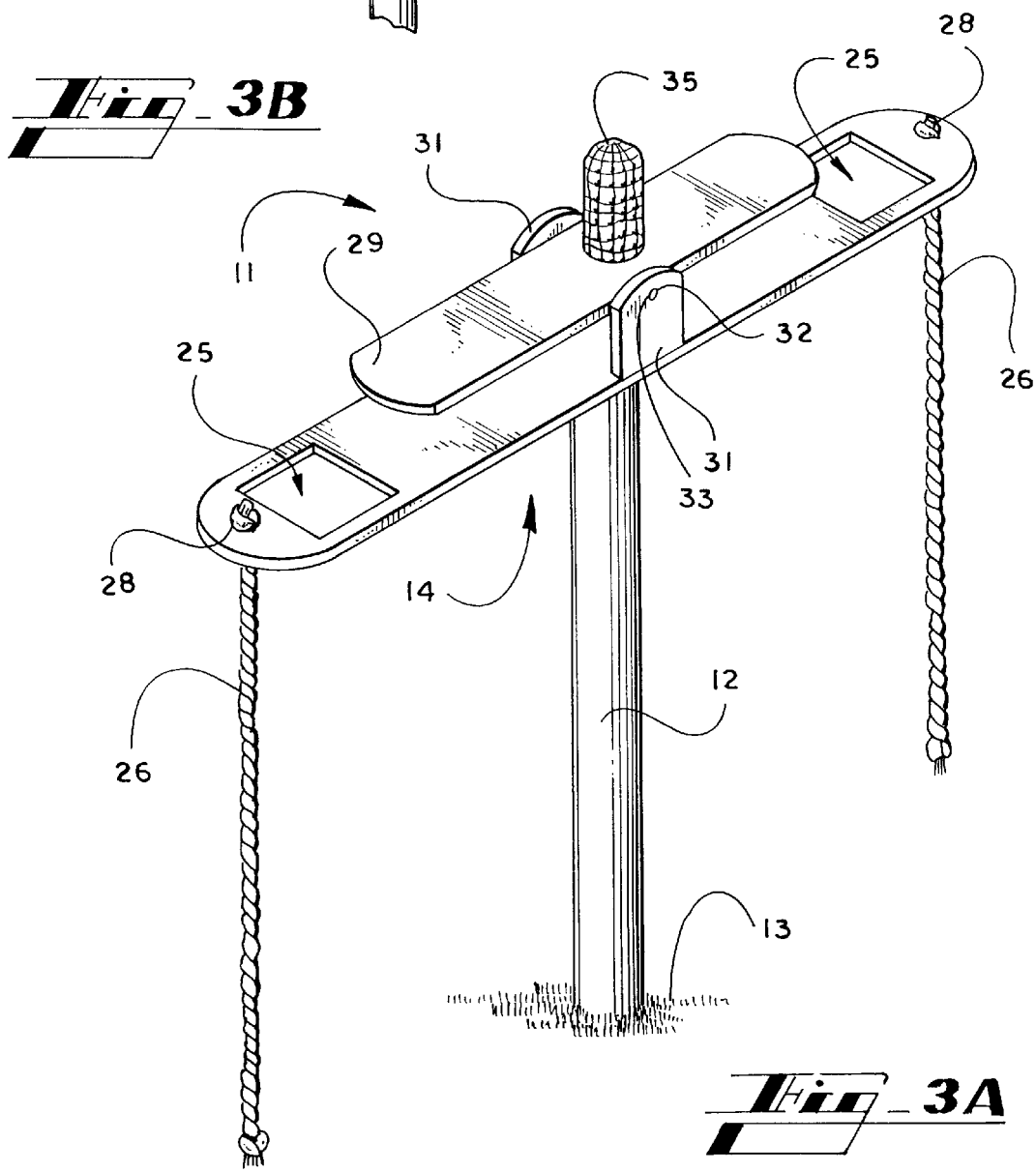
FIG. 3A is a perspective view of a third embodiment of the invention showing a pair of climbing ropes on the platform and showing a teeter-totter board mounted thereupon.

Turning now to FIGS. 3A and 3B which show a third embodiment of the invention, it is seen that this particular embodiment is designed for two or more squirrels to play upon. The squirrel perch 14 has a platform 36 which has, at each end thereof, a configuration which is substantially identical to the other end. In this particular configuration, there are a plurality of access openings 25 and a plurality of climbing ropes 26. The perch 14 is mounted to the ground engaging mounting post 12 in a manner similar to that shown in FIGS. 2A and 2B, which is essentially the same mounting arrangement as shown also in FIGS. 1A and 1B. The teeter-totter board 29 of this embodiment does not have a counterbalance weight on one end thereof, and is free of such weight in order to allow multiple squirrels to play on the board 29 and to teeter-totter in the manner in which children play on such devices. The perch 14 of this embodiment may rotate around the ground engaging mounting post 12 in a similar manner as described by for the other two embodiments.

In the embodiment shown in FIGS. 3A and 3B, a plurality of squirrels would climb the pairs of climbing ropes 26 and gain access to perch 14 probably through openings 25 and, at that point, could easily play upon the teeter-totter board 29 and still access the solid food 35 which is mounted on board 29. A plurality of squirrels playing on such a device would afford a great deal of enjoyment to the individuals who are being entertained by the feeding behavior of the squirrels.

While it is contemplated that the main materials of the invention would be wood, it is certainly anticipated that other suitable materials, such as plastics, could be used to manufacture the invention.

Therefore, the foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. An animal feeder comprising:

a mounting post having a proximal end and a distal end;

a platform mounted to the distal end of the mounting post, the platform being of a generally elongated rectangular configuration of relatively thin cross-sectional area, the platform having a first end and a second end, the first end having an access aperture therein and a climbing rope depending therefrom, the platform being rotatably mounted to the distal end of the mounting post;

a feeding station mounted in juxtaposition to the platform comprising a tray for holding animal food, the feeding station further comprising a mounting base mounted to the platform, the feeding tray being juxtaposed upon the base and a solid food holding member projecting from the feeding tray.

2. An animal feeder as claimed in claim 1, wherein the platform access aperture is of rectangular configuration.

3. An animal feeder as claimed in claim 1, wherein a pair of spaced apart support members are affixed to the platform, a teeter-totter board being pivotally suspended between the support members for a rocking movement upon the application of a predetermined force to the teeter-totter board.

4. An animal feeder comprising:

a mounting post having a proximal end and a distal end;

a platform mounted to the distal end of the mounting post, the platform having a first end and a second end, the first end having an access aperture therein and a climbing rope depending therefrom;

a feeding station mounted in juxtaposition to the platform comprising a tray for holding animal food;

a pair of spaced apart support members being affixed to the platform, a teeter-toter board being pivotally suspended between the support members for a rocking movement upon the application of a predetermined force to the teeter-toter board.

5. An animal feeder as claimed in claim 4, wherein the teeter-totter board has a first end and a second end and a counterbalance weight being affixed to one of the ends of the teeter-totter board.

6. An animal feeder as claimed in claim 5, wherein the counterbalance weight is in the profile shape of an animal.

7. An animal feeder as claimed in claim 6, wherein the feeding station is mounted on the teeter-totter board and comprises a solid food holding member projecting from the teeter-totter board.

8. An animal feeder as claimed in claim 7, wherein the platform is rotatably mounted to the distal end of the mounting post.

9. An animal feeder as claimed in claim 8, wherein the platform access aperture is of rectangular configuration.

10. An animal feeder as claimed in claim 4, wherein the second end of the platform has an access aperture therein, and further has a climbing rope depending therefrom.

11. An animal feeder as claimed in claim 10, wherein the feeding station is mounted on the teeter-totter board and comprises a solid food holding member projecting from the teeter-totter board.

12. An animal feeder as claimed in claim 11, wherein the platform is rotatably mounted to the distal end of the mounting post.

13. An animal feeder as claimed in claim 12, wherein the platform access apertures are of rectangular configuration.

14. An animal feeder as claimed in claim 13, wherein the platform has a lower surface, the lower surface having a mounting area approximately midway between the first and second ends, the platform being mounted to the mounting posts at the mounting area.

\* \* \* \* \*